United States Patent [19]

Kawaoka

[11] 4,039,118
[45] Aug. 2, 1977

[54] CONTAINER WITH DISPENSING MEANS

[76] Inventor: Teru Kawaoka, 3253 Lowe St., College Park, Ga. 30337

[21] Appl. No.: 707,886

[22] Filed: July 22, 1976

[51] Int. Cl.² .................. B65D 5/72; B65G 3/12; A01K 5/02
[52] U.S. Cl. .................. 229/17 B; 119/53.5; 222/199; 222/528; 222/530
[58] Field of Search ............ 229/17 B, 17 M; 119/53, 119/53.5, 54; 222/541, 528, 530, 199; 221/204, 205; 43/131

[56] References Cited

U.S. PATENT DOCUMENTS

| 922,277 | 5/1909 | Gowing | 222/528 X |
|---|---|---|---|
| 1,000,624 | 8/1911 | Pexton | 119/52 R |
| 1,378,533 | 5/1921 | Fitzgerald | 229/17 B |
| 1,436,749 | 11/1922 | Zeschmar | 221/205 X |
| 1,645,771 | 10/1927 | Pillsbury | 119/52 R |
| 1,698,955 | 1/1929 | Lutfring | 221/205 |
| 2,027,645 | 1/1936 | Marx | 229/17 B X |
| 2,434,514 | 1/1948 | Penn | 221/205 |
| 2,909,310 | 10/1959 | Govang | 229/17 B |

FOREIGN PATENT DOCUMENTS

| 12,847 of | 1905 | United Kingdom | 119/53 |
|---|---|---|---|
| 11,052 of | 1905 | United Kingdom | 229/17 B |

*Primary Examiner*—Robert S. Ward, Jr.
*Attorney, Agent, or Firm*—John L. Cline

[57] ABSTRACT

An automatic dispensing container for containing and dispensing granular material is disclosed which may be constructed from a single piece of sheet material to form a container having an internal ramp partition. The ramp serves to direct the material by force of gravity toward and through a dispensing orifice having a configuration which impedes the free flow of material. The rate at which the material is dispensed is controlled by a structure integral with the ramp which, when moved, serves to assist the flow of material through the orifice.

8 Claims, 5 Drawing Figures

U.S. Patent  Aug. 2, 1977  4,039,118
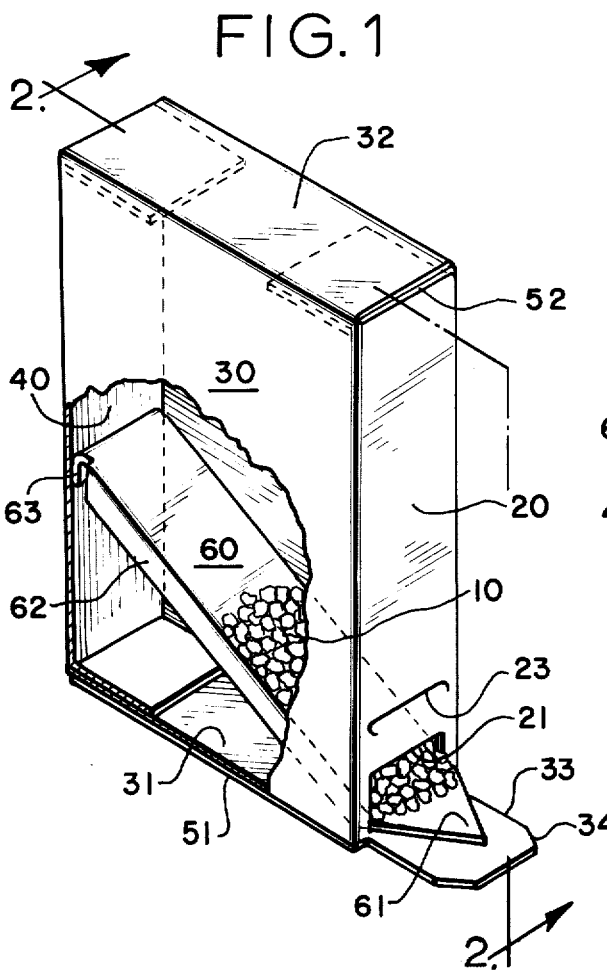
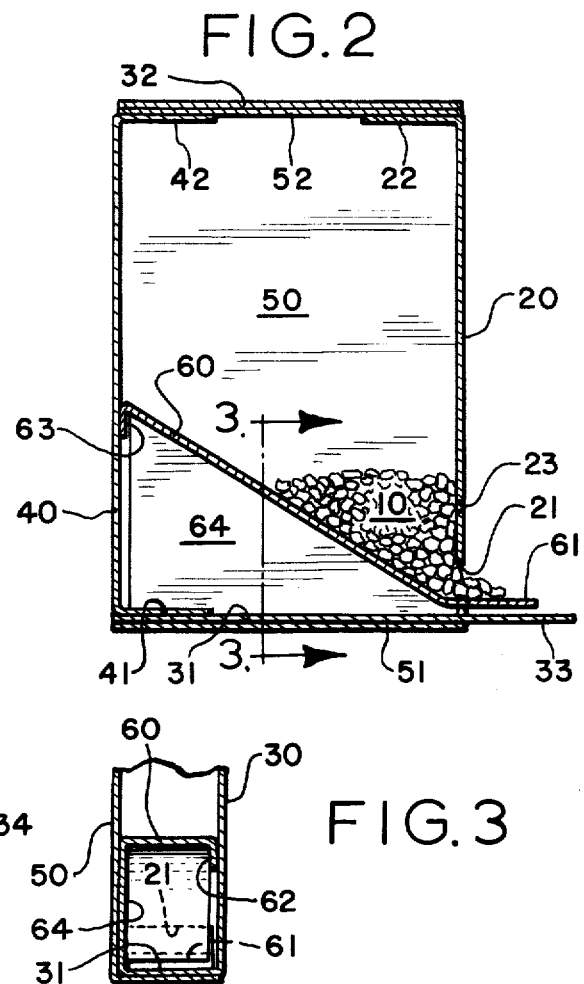
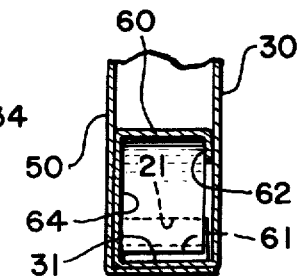
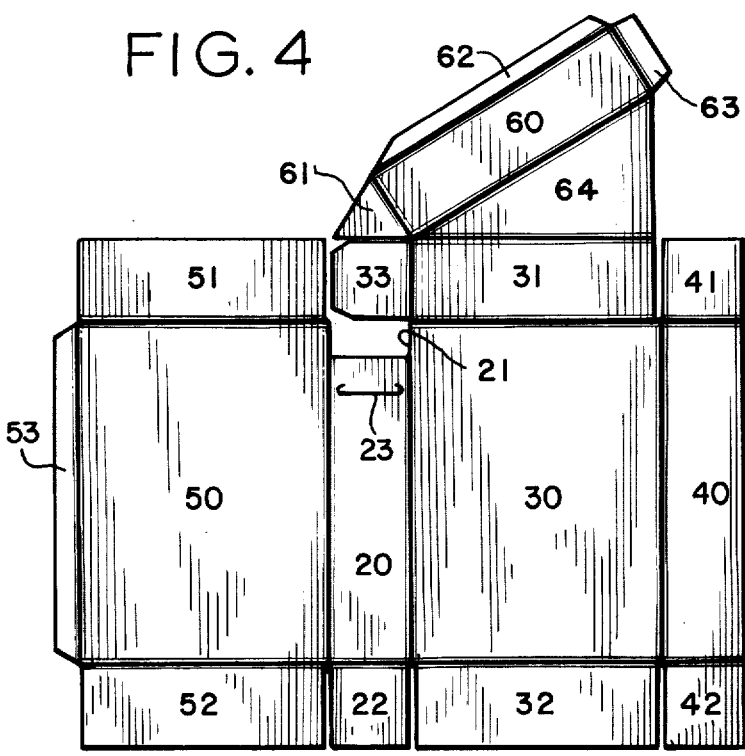
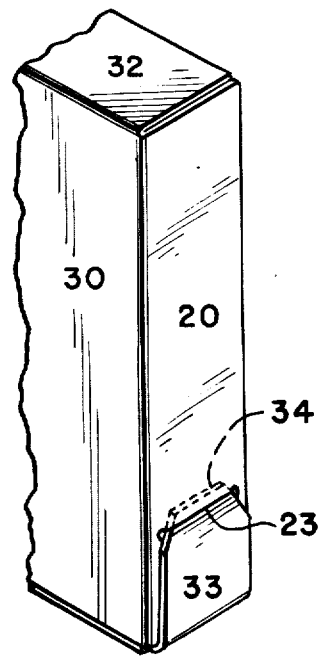

CONTAINER WITH DISPENSING MEANS

BACKGROUND OF THE INVENTION

This invention relates to containers and, more particularly, to automatic dispensing containers for granular materials such as dry pet foods.

In the construction of automatic dispensing containers, the advantages of inexpensive, disposable containers which adequately control the rate at which materials are dispensed have long been recognized. However, dispensing containers adapted for use with granular materials have not achieved these objects in an entirely satisfactory manner. With particular reference to dry feed for animals, the prior art has failed to provide a container which is both inexpensive and disposable and which will properly dispense the dry feed at a controllable rate. For example, one prior art dispensing container disclosed in U.S. Pat. No. 3,763,826 uses a separate, reuseable, tray like structure to support the container and to regulate the dispensing rate of the container. This support structure requires periodic cleaning as it is not disposable, and it increases the cost of the feeder. Other prior art containers have not provided adequate means for regulating the rate at which the granular material is dispensed, resulting in a dispensing rate which may be either greater or less than that required. Moreover, these containers have often been formed in external configurations which are not easily stacked for storage, transportation, or display.

Accordingly, it is an object of this invention to provide an inexpensive, disposable container which dispenses the granular contents of the container at an appropriate rate. It is a further object that the container be so constructed as to permit a rectangular external configuration to facilitate stacking and storage.

SUMMARY OF THE INVENTION

The automatic dispensing container of the present invention is designed to minimize the handling required to dispense the material packaged in the container; the material is packaged, sold, and dispensed in the same container, thereby eliminating the need for a separate dispenser. The container is adapted for dispensing granular feed to an animal at a rate determined by the animal. The animal controls the flow of material out of the container by manipulating a movable component situated near the point at which the food is dispensed.

In one embodiment, the automatic dispensing container serves as the point of sale packaging for dry, granular animal feed. The automatic dispensing components of the container are either internal to the container or disposed flat against one of the outside walls, and the container therefore may be constructed in a rectangular configuration. This permits the container to be easily stacked for display and storage.

BRIEF DESCRIPTION OF THE DRAWINGS

The novel features which are believed to be characteristic of the invention are set forth in the appended claims. The invention itself, however, together with further objects and attendant advantages thereof, will be best understood by reference to the following description taken in connection with the accompanying drawings, in which:

FIG. 1 is a perspective view of one embodiment of the invention with a portion of the side wall broken away and showing the dispensing means in the operating position;

FIG. 1a is a partial perspective view showing the dispensing means in the closed position for storage or shipment;

FIG. 2 is a side sectional view taken along line 2—2 of FIG. 1;

FIG. 3 is a sectional view taken along line 3—3 of FIG. 2; and

FIG. 4 is a plan view of the blank out of which the container may be formed.

DETAILED DESCRIPTION OF THE PREFERRED EMBODIMENT

A preferred embodiment of the automatic dispensing container of the present invention is shown in the drawings. Referring specifically to FIG. 1, the container is shown as comprising four side walls, 20, 30, 40, 50; a bottom wall constructed from two panels 51 and 31; and a top wall constructed from panels 52 and 32. The side, bottom and top walls enclose a volume which constitutes the interior of the container. Into one of the side walls 20 is formed a slot 23 and a materials dispensing orifice 21. The configuration and dimensions of the orifice 21 are adapted to permit the granular material 10 to pass through orifice 21 while impeding the free flow of the material. The specific dimensions of the dispensing orifice 21 will vary with the coarseness of the granular material being dispensed. In the preferred embodiment the container is constructed of cardboard, but other materials such as sheet plastic, stiff paper or sheet metal may also be used.

The bottom wall is provided with a sealing panel 33 which is tapered at one end, 34. The sealing panel 33 is bendably attached to the bottom panel 31 and may be disposed in either of two positions. In the open position depicted in FIG. 1 the orifice 21 is exposed and the granular material 10 within the container may be dispensed. In the closed position depicted in FIG. 1a the tapered end 34 of the sealing panel 33 is engaged in slot 23, thereby sealing the dispensing orifice 21.

The internal partition 60 is transversely disposed within the container, extending substantially across the entire area bounded by side walls 20, 30, 40 and 50. This partition is positioned on an incline within the container with its lower portion adjacent to orifice 21. As shown in the sectional views of FIGS. 2 and 3, the partition 60 is positioned so that, with the container in an upright position, the granular material within the container may flow by force of gravity toward and through the orifice 21. The partition 60 is provided with a triangular tab 61 which extends through orifice 21 and serves as a manipulation or vibrating means by which partition 60 and the lowermost pieces of granular material 10 may be moved or vibrated. Manipulation of tab 61 causes increased quantities of material 10 to flow through the dispensing orifice 21. This triangular tab 61 serves as a regulating means by which the flow of material 10 through orifice 21 may be controlled.

The dispensing container of this invention functions as both a packaging container and a dispensing container. As a packaging container it protects and stores its contents and serves as the point of sale packaging. As a dispensing container it serves as an automatic pet feed. In order to operate the container as an automatic dispenser, sealing panel 33 is moved from its closed to its open position, thereby exposing orifice 21 and triangular tab 61. In order to stabilize the container in the feeding position bottom wall 51 may be provided with securement means such as an adhesive having a removable tape covering. With the container in this position the animal being fed regulates the flow of material out of the container by manipulating triangular tab 61 as discussed above.

Before the container is first opened for use as a dispenser, sealing panel 33 is held in its closed position against side wall 20 by glue or the like. This prevents the sealing panel from accidentally being opened. After the container has been once opened it may be closed by refolding the sealing panel 33 against the side wall 20 and inserting the tapered end 34 of the sealing panel into slot 23.

This embodiment of the invention may be assembled out of the blank depicted in FIG. 4, in which the internal lines represent lines at which the planar blank is folded in order to assemble the three dimensional container.

The assembly of the container preceeds in a manner well understood by those skilled in the art. First, the ramp structure comprising the partition 60 and its supporting elements 62, 63 and 64 is folded into a wedge shaped structure. Then the bottom panel 31 and side wall 40 are folded up and the ramp structure is secured to the side walls by supporting elements 62 and 63. The side walls are next assembled by folding the remaining side walls 20 and 50 around the ramp structure and securing wall support element 53 to side wall 40. Finally, the top and bottom panels, 51, 52 and 32, and associated supporting elements 41, 42 and 22 are folded over the enclosed volume and secured.

In general, the top walls would not be secured until sealing panel 33 had been folded up along line 85 and affixed to side panel 20, thus sealing the dispensing orifice 21. Then the internal volume above partition 60 would be filled with granular material and the top walls would be secured.

In this embodiment of the invention all elements of the container, including the internal partition 60 and the sealing panel 33, are assembled from one piece of sheet material. In most instances, the use of such a one piece blank will minimize the number of required construction steps and thereby the construction cost. However, a second embodiment of the invention is better suited to the situation where standard container blanks are to be used in constructing the automatic dispensing container. In this second embodiment a separate ramp structure is employed corresponding to the partition 60, triangular tab 61 and support elements 62, 63, 64 of FIG. 4. This embodiment is constructed by forming a materials dispensing orifice 21 in one of the side walls of the standard container blank and then assembling the blank with the ramp structure secured to the interior of the container. As in the first embodiment the partition 60 is disposed within the container with its lowermost portion adjacent to the orifice 21.

Of course, it should be understood that various changes and modifications to the preferred embodiments described herein will be apparent to those skilled in the art. For example, the container may be closed with a hinged metal spout or a sliding panel rather than the folding panel 33 disclosed above; or folding panel 33 may be secured in the closed position depicted in FIG. 1a with adhesive rather than the tab and slot arrangement shown. The manipulating tab 61 may be shaped otherwise than shown or constructed of other materials. Similarly, the orifice 21 may be precut as shown or it may be defined by one or more perforated lines to allow the purchaser to vary the size of the orifice for proper dispensing.

Such changes and modifications can be made without departing from the spirit and scope of the present invention and without diminishing its attendant advantages. It is, therefore, intended that such changes and modifications be covered by the following claims.

I claim:

1. In a container of the type used for packaging and dispensing flowable, solid materials, having a side wall, the improvement which comprises:
    a materials dispensing orifice formed in said side wall, said orifice having a configuration adapted to impede the free flow of said materials therethrough;
    a moveable partition extending substantially across the entire area bounded by said container, said partition being positioned on an incline with a free lower portion thereof adjacent said orifice such that materials within said container may flow by force of gravity and in response to movement of said free lower portion toward and through said orifice; and
    manually controllable means situated adjacent the exterior face of said orifice for moving said free lower portion for assisting the flow of said materials through said orifice to allow controlled amounts of said material to be dispensed from said container.

2. A container for packaging and dispensing flowable solid materials comprising:
    four side walls, each joined along its lateral edges to adjacent side walls, and one of said side walls having a materials dispensing orifice with a configuration adapted to impede the free flow of said materials therethrough;
    a moveable partition extending substantially across the entire area bounded by said side walls, said partition being positioned on an incline with a free lower portion thereof adjacent said orifice such that materials within said container may flow by force of gravity and in response to movement of said free lower portion toward and through said orifice; and
    manually controllable means affixed to the lower portion of said partition and extending through said orifice for moving said free lower portion for assisting the free flow of said materials through said orifice to allow controlled amounts of said material to be dispensed from said container.

3. The container of claim 2 wherein said materials dispensing orifice is configured with a vertical dimension sufficiently small to impede the free flow of said materials therethrough.

4. The container of claim 2 further including a bottom wall having edges which join with the lowermost edges of said side walls, said partition being disposed within said container and above said bottom wall.

5. The container of claim 2 further including means attached to said one wall for opening and closing said orifice.

6. The container of claim 2 further including a panel pivotally attached to said one wall and adapted to close said orifice, and means for securing said panel to said one wall in the closed position.

7. The container of claim 6 wherein said flow assisting means is a triangular tab having one edge thereof affixed to the lower portion of said partition, said tab extending generally horizontally through said orifice when the panel is in the open position and disposed between said one wall and said panel when the panel is in the closed position.

8. A container for packaging and dispensing granular, dry pet food comprising:
- four side walls, each joined along its lateral edges to adjacent side walls, and a bottom wall joined at the edges thereof with the lower most edges of said side walls;
- one of said side walls having an orifice with a vertical dimension sufficiently small to impede the free flow of said pet food therethrough, said orifice being located on said one wall adjacent said bottom wall;
- a moveable partition disposed within said container and extending across substantially the entire cross-sectional area thereof, said partition being inclined with a free lower portion thereof adjacent to said orifice to direct said pet food toward and through said orifice in response to gravity and movement of said free lower portion;
- manually controllable means affixed to the lower portion of said partition and extending through said orifice for vibrating said free lower portion of said partition to dispense controlled amounts of said pet food from said container;
- a panel attached to said bottom wall at the edge adjacent said one wall, said panel adapted to fold upwardly from an open position to a closed position to cover said orifice and said vibrating means; and
- means for securing said panel to said one wall in the closed position.

* * * * *